CHARLES A. DEAN.
Improvement in Machines for Cleaning Sisal, Hemp, and other Grasses.
No. 115,828.    Patented June 13, 1871.
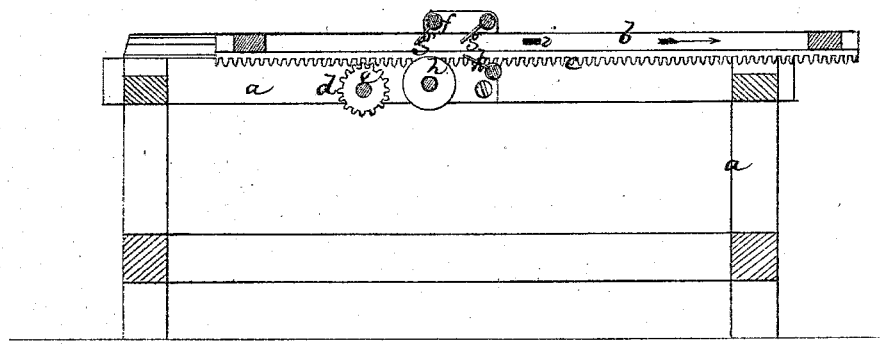
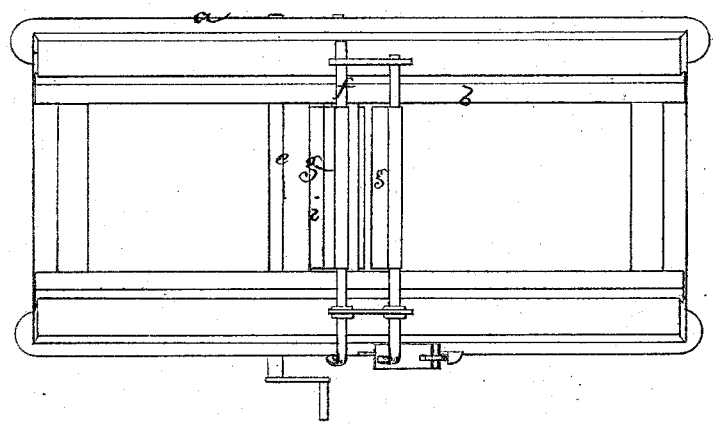
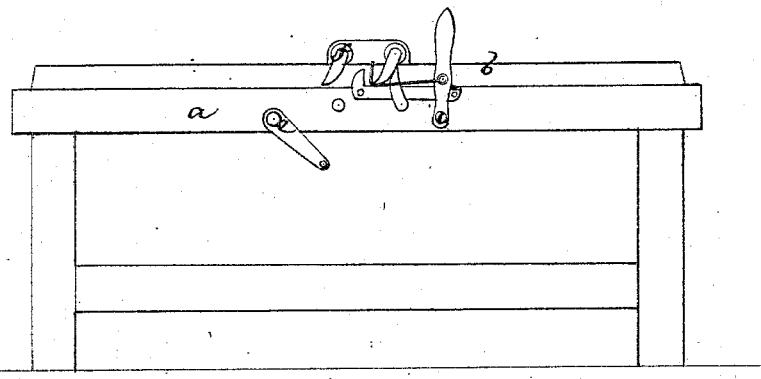

UNITED STATES PATENT OFFICE.

CHARLES A. DEAN, OF BOSTON, MASSACHUSETTS, ASSIGNOR TO JAMES A. COE, OF SAME PLACE.

IMPROVEMENT IN MACHINES FOR CLEANING SISAL, HEMP, AND OTHER GRASSES.

Specification forming part of Letters Patent No. 115,828, dated June 13, 1871.

*To all whom it may concern:*

Be it known that I, CHARLES A. DEAN, of Boston, in the county of Suffolk and State of Massachusetts, have invented certain Improvements in Machines for Cleaning Sisal and other Grasses; and I do hereby declare that the following, taken in connection with the drawing which accompanies and forms part of this specification, is a description of my invention sufficient to enable those skilled in the art to practice it.

My invention relates to some of the details of construction or organization of machines for stripping or scraping the leaves of Sisal grass and other similar stalks or leaves, to separate the pulpy matter from the fibers and leave the latter in condition for subsequent treatment in machines for preparing fiber for spinning. My invention relates particularly to the stripping or scraping mechanism and the mechanism for holding and feeding the grass to the scraper or scrapers.

In my machine I employ a scraper either in connection with another scraper or in connection with a roll, the scraper being set inclining over the roll or other scraper, and the feed of the material being in a direction to draw the scraper toward the roll or toward the other scraper, so that as the material is fed it is pinched between the scraping-edge and the edge to roll beneath it, and the movement of the grass causes the scraper (pinched down upon it) to scrape off the pulpy matter from the grass and leave the fibers. It is in the employment of such a scraper or scrapers and in the employment of a feed or draw bar over which the grass is doubled to be fed that my invention consists.

The drawing represents a machine embodying my improvements.

A shows the machine in plan. B is a side view of it. C is a sectional elevation of it. *a* denotes a suitable frame-work; *b*, a reciprocating carriage moving on such frame, the carriage having under one of its side rails a gear-rack, *c*, into which meshes a gear-pinion, *d*, on a crank-shaft, *e*, the carriage being driven in either direction by turning the crank-shaft. Over the carriage *b* extends a cross-shaft, *f*, and from the under side of the shaft projects a blade or scraping-edge, *g*. The shaft is mounted and turns in suitable bearings, and under it is a roll, *h*, the axis of the roll and the axis of the scraper-shaft being in the same, or substantially the same, vertical plane, and the blade stands out from said plane, as seen at C. The carriage *b* travels between the scraper-shaft and the roll, and on the carriage, from one to the opposite side rail thereof, extends a feed or draw bar, *i*.

As the carriage is moved in the direction of the arrow thereon, and the bar approaches the scraper and roll, the grass is held down in front of the draw-bar and is folded or doubled over it by the scrapers or scraper and roll as the bar passes between them, the roll on one side and the scraping-edge upon the other biting upon the grass, and the friction of the grass against the edges of the blade causes the edge to be forced down toward the roll, so that the grass is pinched between the edge and the roll, and its pulpy part removed by the action of the scraper. Instead of the lower roll, the second scraper *k* may be employed, this scraper moving toward the other by the movement and friction of the grass and the two scrapers griping the material, so that by its movement between them the pulp is scraped from it. In either case, the extent of downward movement of the scraper-bar may be limited by suitable locking or stopping devices, so as to prevent such extent of movement of the edge as shall effect a stoppage of the grass; and this limiting mechanism is preferably made adjustable, so that the scraper-edge can descend more or less, as circumstances may require.

After the grass has been thus carried forward between the scrapers, or between the scraper and roll, the carriage *b* may be fed back, taking the grass to the action of the scraping-edge, but without the stress upon the grass created by the downward movement of the scraper as the grass goes forward under the scraper, the scraper being simply locked in position so as to resist the tendency of the grass to throw the scraper up as it passes under the scraper. The repeated action of the scraper soon strips off the pulp and coating from the leaves, and the feed-bar, by acting upon the doubled or folded leaf, efficiently carries the grass to the action of the scraper.

The machine thus organized is very simple and inexpensive, does the stripping very quickly, and leaves the fiber in the requisite condition for after treatment.

I claim—

1. The scraper and roller or scrapers $g\,h$, arranged to operate automatically by the passage of the material between them, substantially as described.

2. In combination with the scrapers $g\,h$, the reciprocating feed or draw bar $i$, substantially as described.

3. The method of holding the Sisal or other grass or fibrous material for the action of the stripping or scraping mechanism by means of the reciprocating bar $i$, as and for the purpose described.

CHARLES A. DEAN.

Witnesses:
 FRANCIS GOULD,
 M. W. FROTHINGHAM.